(No Model.) 2 Sheets—Sheet 1.
G. HANCOCK.
VESTIBULED RAILWAY CAR.
No. 489,906. Patented Jan. 10, 1893.
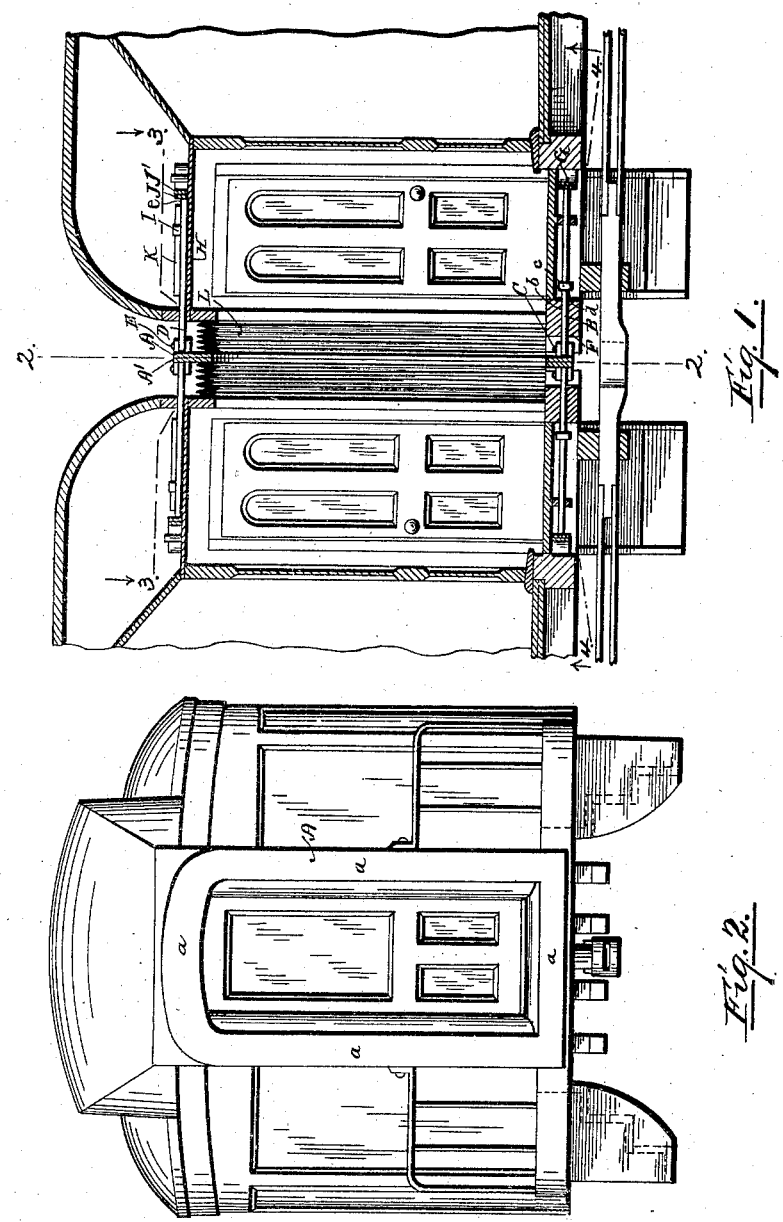

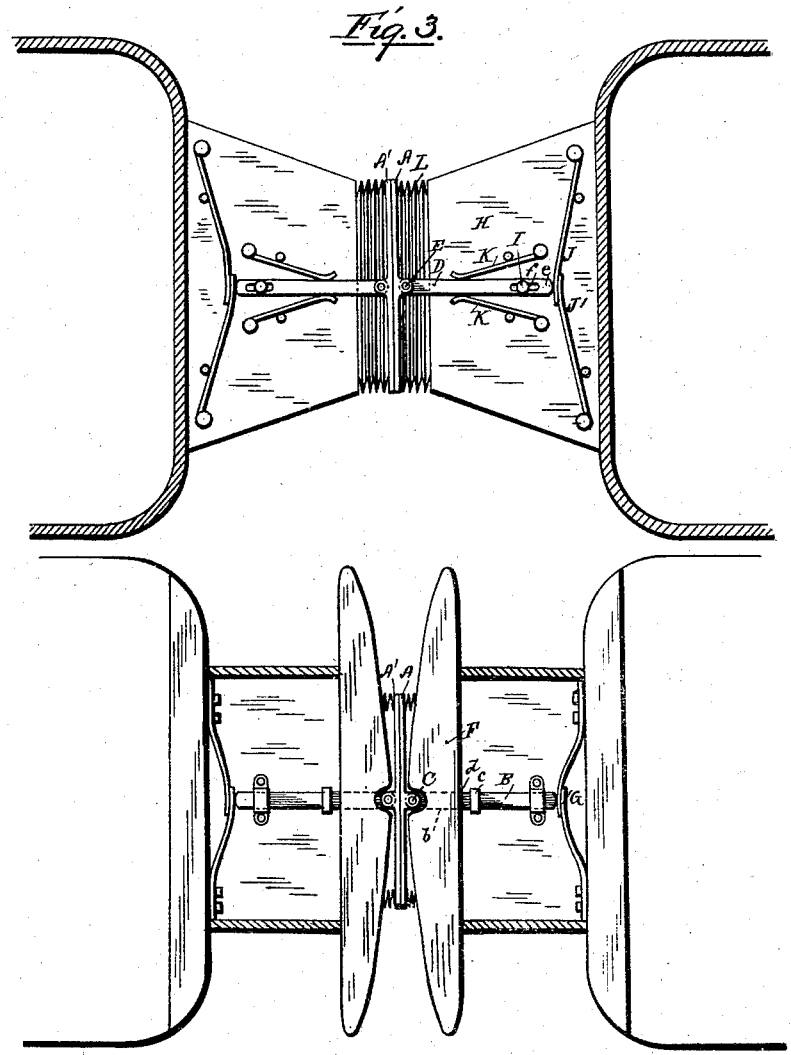

UNITED STATES PATENT OFFICE.

GEORGE HANCOCK, OF PROVIDENCE, RHODE ISLAND, ASSIGNOR TO HIMSELF AND SHEFFIELD SMITH, OF SAME PLACE.

VESTIBULED RAILWAY-CAR.

SPECIFICATION forming part of Letters Patent No. 489,906, dated January 10, 1893.

Application filed October 15, 1892. Serial No. 449,022. (No model.)

*To all whom it may concern:*

Be it known that I, GEORGE HANCOCK, a citizen of the United States, residing at Providence, in the State of Rhode Island, have invented a new and useful Improvement in the Construction of Vestibuled Railroad-Cars, of which the following is a specification.

The object of my invention is to provide the car vestibule with a contact frame which, while held against lateral movement at the lower end will be free from the swagging movement of the top of the car and it consists in the combination of the contact frame with suitable pivot bars, and springs, as hereinafter fully set forth.

Figure 1, shows the abutting ends of two cars, as when coupled together, and provided with yielding contact frames. Fig. 2, represents an end view of one of the cars, and the vestibule provided with a yielding contact frame. Fig. 3, represents a top view of the connected vestibules showing the upper pivot bar. Fig. 4, represents an under view of the platform, showing the lower pivot bar.

In the accompanying drawings, A represents the contact frame, which at its lower end is centrally pivoted to the sliding bar B, by means of the pivot pin C, and at the upper end is centrally pivoted to the sliding and laterally moving bar D, by means of the pivot pin E. The contact frame A is made plain upon its face $a$, to abut against the contact frame A' of the adjoining car. The bar B is adapted to slide directly back and forth in the guide opening $b$ made in the platform F of the car, and at the rear of the bar B are placed the springs G, which serve to hold the bar B and the lower end of the frame A in their forward position, the forward movement of the bar B being limited by the collar $c$, and shoulder $d$, or by any suitable stop. The bar will thus be allowed to move only in the direction of its axis, so that the frame A will be held at its lower end against lateral movement but will be allowed to move back and forth with the spring actuated bar B to which it is pivoted. The bar D is supported by the ceiling plate H, and is provided with a slot $f$, in which is placed the stud I, secured to the plate H, the end $e$ of the bar D being made to bear against the spring J, which is backed by the spring J', both springs being attached to the ceiling plate, and at the opposite sides of the bar D, are placed the springs K, K, which serve to hold the bar D in its proper intermediate position, in line with the lower holding bar B. The frame A is connected with the vestibule, by means of the flexible fabric L, so that the said frame may have a limited movement in all required directions.

I claim as my invention:

The combination with the vestibule of a railway car, of the centrally pivoted contact frame, the loosely guided lower pivot bar adapted for endwise movement, a spring for actuating the said bar to its forward position, the upper pivot bar adapted for both endwise and lateral movement, the springs for actuating the said bar to its forward position, the opposing side springs adapted for lateral movement, and the flexible fabric which serves to connect the pivoted frame to the vestibule, substantially as described.

GEORGE HANCOCK.

Witnesses:
SOCRATES SCHOLFIELD,
JAMES W. BEAMAN.